United States Patent
Zervas

(10) Patent No.: US 7,403,686 B1
(45) Date of Patent: Jul. 22, 2008

(54) FIBER OPTIC CABLE SPLICING TECHNIQUE

(75) Inventor: Harry Zervas, Lincoln, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/645,268

(22) Filed: Nov. 30, 2006

(51) Int. Cl.
*G02B 6/44* (2006.01)
(52) U.S. Cl. .......................... 385/100; 385/95; 385/96; 385/97; 385/98; 385/99; 65/406; 65/407; 65/408
(58) Field of Classification Search .................. 385/100, 385/95–99; 65/406–408
See application file for complete search history.

(56) References Cited

U.S. PATENT DOCUMENTS

| | | | |
|---|---|---|---|
| 7,217,809 B2 * | 5/2007 | Schultz et al. ............. | 536/23.2 |
| 7,226,328 B1 * | 6/2007 | Puzella et al. ................. | 441/11 |
| 2004/0151451 A1 * | 8/2004 | Wallace ....................... | 385/123 |
| 2006/0016616 A1 * | 1/2006 | Goldsworthy et al. .... | 174/128.1 |
| 2006/0280417 A1 * | 12/2006 | Sato et al. .................... | 385/134 |

* cited by examiner

*Primary Examiner*—Brian Healy
*Assistant Examiner*—Hung Lam
(74) *Attorney, Agent, or Firm*—James A. Kasischke; Michael P. Stanly; Jean-Paul A. Nasser

(57) ABSTRACT

The invention is a staggered splice and method for making the same. The staggered splice is used to join two multi-fiber optic cables. Each opposing pair of optic fibers is cleaved such that they all have substantially the same combined length and provide fully operable communication. The light transmitting interfaces are staggered with respect to each other. The individual splices can be mechanical or fusion splices. The splices are typically bundled and protected with a sheath. The staggered splice is particularly applicable for connecting torpedo payout spools wound with the multi-fiber optic micro cable to the shipboard side wire.

10 Claims, 4 Drawing Sheets

FIBER OPTIC CABLE SPLICING TECHNIQUE

STATEMENT OF GOVERNMENT INTEREST

The invention described herein may be manufactured and used by or for the Government of the United States of America for Governmental purposes without the payment of any royalties thereon or therefore.

BACKGROUND OF THE INVENTION (1) Field of the Invention

The present invention relates generally to Precision Guided Munitions (PGM), and in particular to a method and a splice for splicing multi-fiber optic micro cables for the guidance thereof.

(2) Description of the Prior Art

Legacy systems used for Precision Guided Munitions (PGM), such as wire guided torpedoes, use thin metal wires to provide a communications link between the munition and the controller. The bandwidth of the communications link decreases linearly with distance, and as the range of these weapons increases, the reduced bandwidth of the interconnecting wire cable limits the rate at which data can be transmitted between a submarine and a torpedo to about 200 baud. Current requirements are for multi gigahortz data rates to enable real time video imaging and on the fly reprogramming. Several initiatives to replace the wire link with fiber optic technology are being pursued. A requirement for using metal wire or fiber optic wire guided torpedoes is that the torpedo's wire must be spliced to the shipboard-side wire. For payout reasons, this splice is more complex when using fiber optics, because the splicing requirements for fiber optic cable must enable continuous light transmission. As will become evident from the discussion below, typically fiber optic wire is spliced incorporating a loop of fiber optic cable to help relieve the stress. A loop is unsuitable for a precision inside payout spool, as it can become entangled in the wraps. Conventional splices, including both mechanical and fusion splices, without the strain relief loop are relatively weak compared to the splice-free cable, and the splice is prone to failure during payout.

FIG. 1 shows a prior art torpedo mounted dispenser (TMD) 10 mounted on an aft portion of a torpedo 12. The TMD 10 is disconnectably attached to the torpedo 12, such that upon launch of the torpedo, the TMD which is fastened in the launch tube, parts from the torpedo 12 and remains in the launch tube. The TMD 10 incorporates a spool 14. A control wire 16 is coiled on spool 14 so as to pay out to torpedo 12 after launch. A fiber optic splice 18 may be needed between TMD 10 and torpedo 12 or between a submarine and an external end of control wire 16.

U.S. Pat. No. 4,043,854 to Georges Le Noane et al. disclose a method for splicing optical fiber cables having an axial core and fibers disposed around the core. At the places where splicing will have to be made, the jacket of the cable is removed, the fibers are glued on the core and two half-shells are disposed around the glued fibers encasing them. The half-shells are bonded to the core and fibers by gluing under pressure. When the glue has set, the half-shells together with the fibers and cable core are sawn perpendicularly to the cable axis which gives two half-shell segments. These segments have registering bores and splicing is achieved by inserting calibrated columns or pins into these bores.

U.S. Pat. No. 4,657,343 to Oldham et al. teaches that when splicing packages containing a number of optical fibers, one cannot guarantee the exact length of each fiber over the joint. Thus the result that some fibers will be shorter than others, and thus there will be some excess length. It is desired to dispose of this excess length in a cavity with the smallest diameter and length possible. The length of the reinstatement tube is preferably such that the optical fibers are arranged in the cavity thereof in a helical snake-like fashion with the minimum bending radius for the fibers not being exceeded.

U.S. Pat. No. 5,050,945 to Sorensen teaches an apparatus and method for splicing light conductors in composite cables, in particular marine cables, comprising a plurality of spliced cable sections of power conductors and sections of light conductors. With a view to uninterrupted armoring along the entire length and thus the ability to maintain a sufficient tensile and flexural strength, the splice of the light conductors is provided at a distance from the splice of the power conductors and with a cross-sectional contour which essentially corresponds to the cable cross-section. Then the armoring is wound uninterruptedly around the cable and encloses the splices of the power conductors as well as the light conductors.

GB2169093 to MacKinlay teaches an optical fiber splice housing for multi-element cables. The invention relates to a protective housing for splices made in optical fibers incorporated in multi-element cables, such as hybrid electric and fiber-optic cables. In a cable comprising one or more optical fibers, it is usual to protect sections of optical fiber containing a splice by preventing tension being applied across the splice and by including one or more loops of optical fiber in the region of the splice within the cable. It is also a common requirement at splice sites in cables containing optical fibers to be able to accommodate a range of surplus lengths of the component optical fibers, which it is convenient to accommodate in the form of loops. All such loops of optical fiber must have a diameter greater than a certain size both in order to prevent optical losses, and to reduce fatigue of the optical fiber due to internal stresses. Limits on the outer diameter of a cable place constraints on the maximum diameter of optical fiber loop that can be accommodated in the cable. In fiber-optic cables and hybrid cables comprising two or more cable elements, there are difficulties accommodating such loops of optical fiber safely and conveniently. For instance, wrapping a length of fiber around the exterior of the cable exposes it to mechanical harm.

SUMMARY OF THE INVENTION

A replacement torpedo wire is fiber optic micro cable. Conventional fiber optic micro cable is a composite comprised of a core of optical fiber surrounded by at least one layer of fiberglass yarn and an adhesive. The composite is usually covered by a resilient sheath, where the material for the sheath is typically selected as to provide relatively low friction. For instance poly-fluorinated and polysilicone materials are commonly used. Less expensive polyolefins and polyvinylchlorides are also sometimes employed, as well as materials that are doped with low friction additives. The problem with splices formed using the conventional fiber optic micro cable is that they are not reproducibly reliable, the actual strength of the splice being somewhat a function of the type of splice employed.

The two most common types of splices are a mechanical splice, and a fusion splice. As will become clear, this invention is not limited by the specific type of splice, but for sake of completeness some background on the mechanical splice and the fusion splice is provided.

Mechanical splicing provides an optical junction where a pair of opposing fibers segments are precisely aligned and held in place by a self-contained assembly. There normally is no permanent bond. This method aligns the two fiber ends to a common centerline, aligning their cores so the light can pass from one fiber to another. The apparatus typically has an index matching gel inside the mechanical splice apparatus that helps couple the light from one fiber segment end to an opposing fiber segment end. Older mechanical splice apparatus utilize an epoxy rather than the index matching gel.

Fusion splicing is a junction of two or more optical fiber segments that are permanently connectedly fused by welding them together with an electronic arc or the like. There are four basic steps to completing a proper fusion splice. In the first step, each fiber segment is prepared by stripping the protective coatings, jackets, tubes, strength members, and the like. leaving only the bare fiber showing. The major concern of the preparation is to provide a clean fiber. In the second step the fiber segments are cleaved. The cleaved end must be mirror-smooth and perpendicular to the fiber axis to obtain a proper splice. The cleaver normally does not actually cut the fiber, it merely nicks the fiber and, when pulled or flexed, the fiber forms a clean break. The goal is to produce a cleaved end that has an end that is as close as possible to perpendicular with reference to the axis of the fiber. In the third step the fiber segment ends are aligned and fused. Alignment can be manual or automatic. Once properly aligned a fusion splicer unit generates an electrical arc to melt the fibers welding the two fiber segment ends together. In the fourth step, the splice is fitted with a protective sleeve. The protective sleeve supports the fiber from bending and tensile forces, therein ensuring that the fusion splice does not break during normal handling.

A typical fusion splice has a tensile strength between 0.5 and 1.5 lbs and will not break during normal handling, but the fusion splice still requires protection from excessive bending and pulling forces. Common protective sleeves or the like are heat shrink tubing, silicone gel and/or mechanical crimp protectors. The prior art teaches that cable is looped and lashed to distribute the load back over the splice-free optical fiber. As already discussed, the loop is not well handled by precision inside payout spools.

The invention is a method and a splice for splicing multi-fiber optic micro cables, where the core of both cables has at least two optical fibers surrounded by at least one layer of fiberglass yarn and an adhesive. The optical fibers are substantially the same as the optical fiber used in the conventional mono-fiber optic micro cable. For purposes of enhancing the symmetry, the multi-fiber optic micro cable preferably has a core comprised of three optical fibers. The addition of the extra optical fibers forming the core enables a reduction in the fiberglass yarn, such that the total diameter of the multi-fiber optic micro cable stays substantially the same as the conventional mono-fiber micro cable. The multi-fiber optic micro cable is advantageously staggeredly spliced, such that tensile forces on the splice are distributed over multiple optical fibers, and the facial interface of the joined sections of any single spliced optical fiber is reinforced by two adjacent unspliced optical fibers.

In the invented staggered splice, the multi-fiber optic micro spliced cable is comprised of optical fibers having a staggered length, such that a first fiber is shorter than a second fiber, and the second fiber is shorter than a third fiber. For a spliced cable having an overall length (L) with one staggered splice, the spliced multi-fiber optic micro cable is comprised of two spliced sections ($S_1$ and $S_2$), each with a staggered core, where the optical fibers comprising the core are staggeredly joined such that each spliced fiber has an overall length that is substantially the same, such that each spliced fiber contributes to the total strength of the micro cable, and the tension on the cable is distributed over the staggered length of the splice. Optimally, the core of section $S_1$ has a first optical fiber with a length of $S_1C1$, a longer second optical fiber with a length of $S_1C2$, and a longest third optical fiber with a length of $S_1C3$, and the core of section $S_2$ also has a first optical fiber with a length of $S_2C1$, a shorter second optical fiber with a length of $S_2C2$, and a shortest third optical fiber with a length of $S_2C3$; wherein the overall length of the spliced sections are each equal to the overall length of the cable. In that case $S_1C1+S_2C3=L$, and $S_1C2+S_2C2=L$, and $S_1C3+S_2C1=L$. The individual fiber splices are made by fusion splicing, mechanical splicing, and the like. The invented multi-fiber optic micro cable has the additional advantage that extra optical fibers provide a redundant communication wire, and even greater bandwidth.

BRIEF DESCRIPTION OF THE DRAWINGS

The foregoing invention will become readily apparent by referring to the following detailed description and the appended drawings in which.

DESCRIPTION OF THE PREFERRED EMBODIMENT

Figure 1:
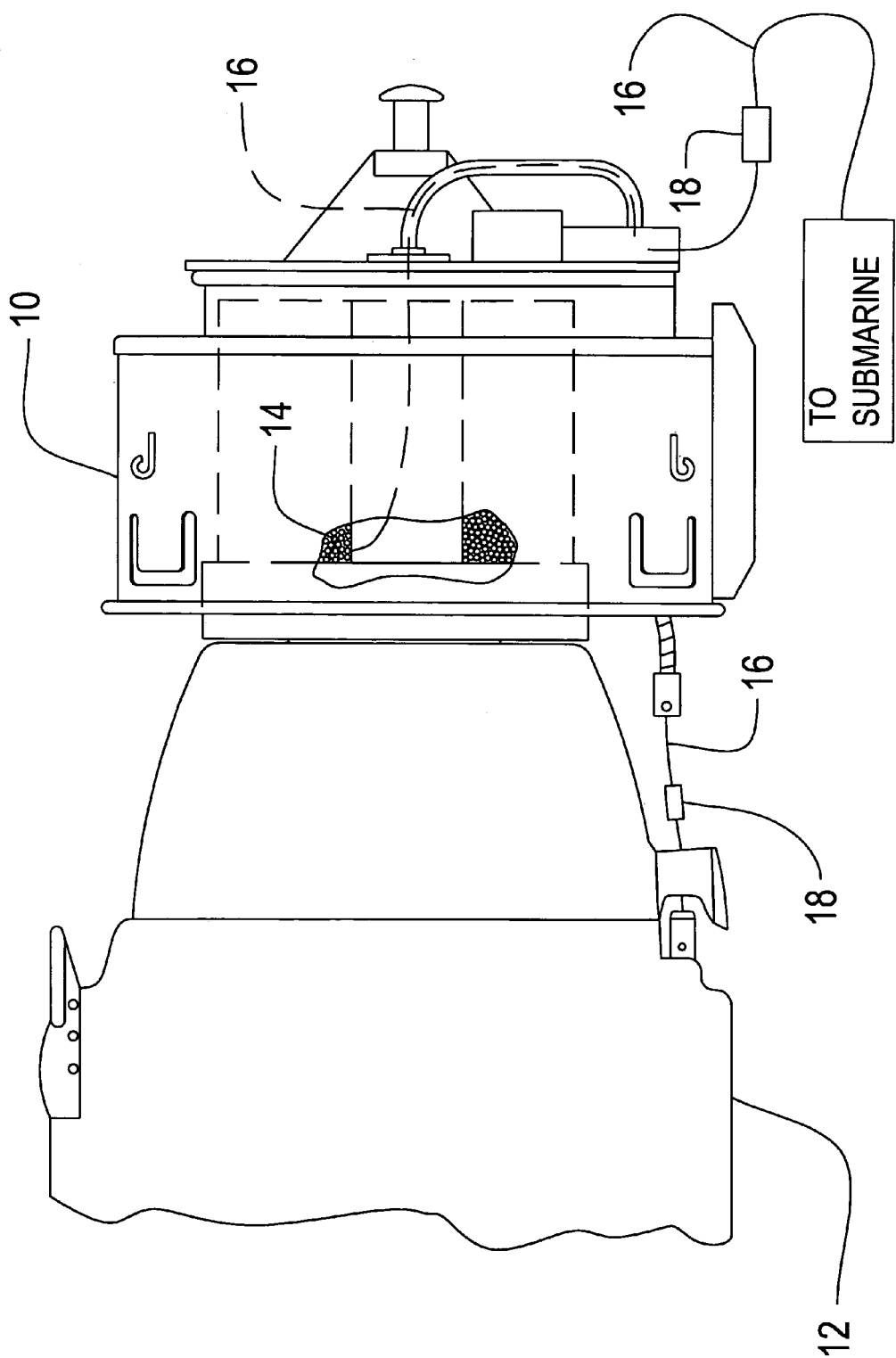
FIG. 1 is a partially cut away view of the aft end of a torpedo showing a spliced fiber optic cable joined to the torpedo before launch.
Figure 2:
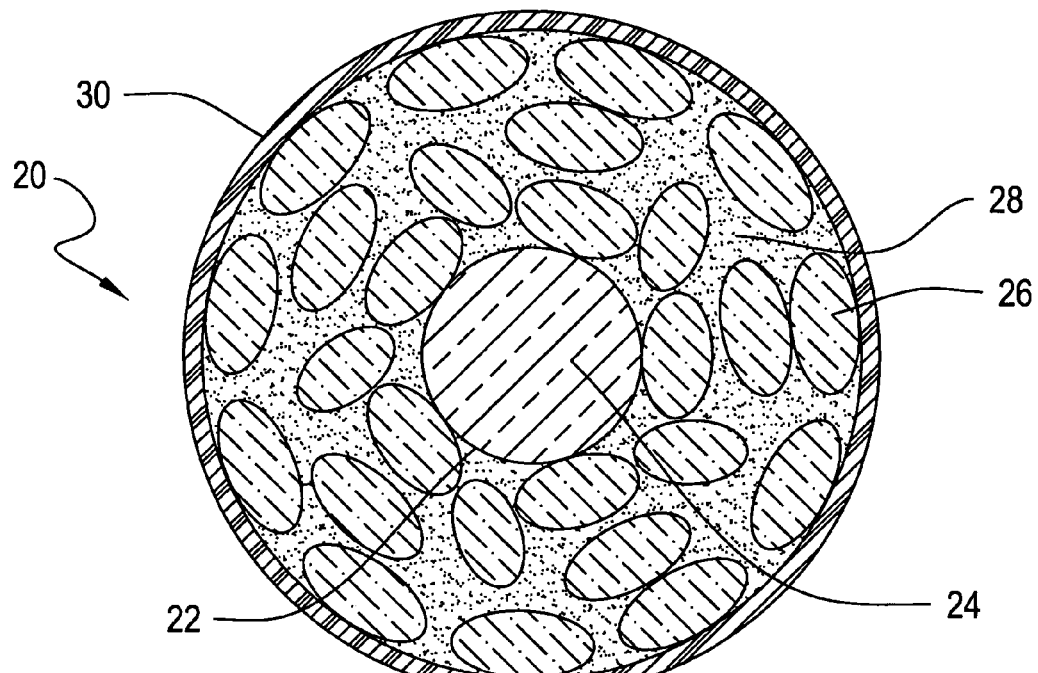
FIG. 2 is a cross-sectional view of a fiber optic micro cable.
Figure 3:
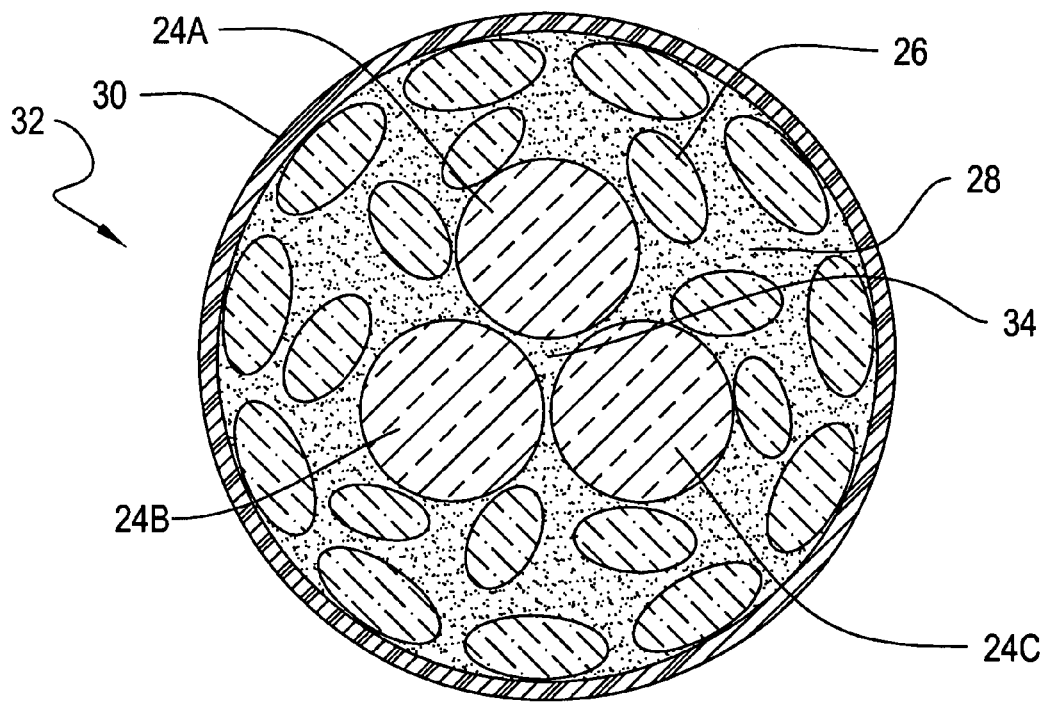
FIG. 3 is a cross-sectional view of a multi-fiber optic micro cable having a core with three optical fibers.

The invention is a method and a splice for splicing multi-fiber optic micro cables. FIG. 2 illustrates the prior art for a mono-fiber optic micro cable. The mono-fiber optic micro cable 20 is a composite comprised of a core 22 of optical fiber 24 surrounded by at least one layer of a fiberglass yarn 26 and an adhesive 28. An elastomeric outer layer 30 can be positioned around the yarn 26 and adhesive 28 on the exterior of cable 20. The invented splice is for splicing a multi-fiber optic micro cable 32 as illustrated in FIG. 3, where the core 20 has three optical fibers 24A, 24B and 24C surrounded by at least one layer of fiberglass yarn 26 and an adhesive 28. The optical fibers in both the mono-fiber and the multi-fiber optic micro cable both have a diameter of about 10 mils, and the cable has an overall diameter of about 30 mils. The configuration of the staggered splice 38 for a splice multi-fiber optic micro cable is illustrated in FIG. 3. As is readily apparent, the facial interface of the joined sections of any single spliced optical fiber is reinforced by two adjacent unspliced optical fibers. Individual fiber splice 36A is offset from 36B and 36C, splice 36B is offset from 36A and 36C and splice 36C is offset from 36B and 36A. As a rule of thumb, splices 36A, 36B and 36C should be offset by at least 2 inches from each other. Large offsets may be needed in applications that are subject to greater stresses. In the invented staggered splice of the multi-fiber optic micro cable the individual fiber optic fibers have a staggered length, such that a first fiber is shorter than a second fiber, and the second fiber is shorter than a third fiber. The spliced cable has an overall length (L) with one staggered splice. Each of the optical fibers 24A, 24B and 24C is comprised of two spliced sections. From inspection of optic fiber 24C, which is comprised sections $S_1$ and $S_2$, section $S_1$ has a length of $S_1C3$ and section $S_2$ has a length of $S_2C1$. The overall length of the splice section L is the sum of $S_1C1$ and $S_2C3$. Optic fiber 24B has sections $S_1$ and $S_2$ having lengths $S_1C2$ and $S_2C2$. There are three pairs of sections. It is important that each pair of the spliced sections are joined such that each spliced fiber has an overall length that is substantially the same, so that no individual optic fiber is loose and such that each individual spliced fiber contributes to the total strength of the micro cable, and the tension on the cable is distributed over the overall length of the staggered splice. During and after splicing it should be confirmed that the interface of each individual splice results in light transmission of optical data. Fusion splicing is preferred for underwater applications. After joining the sections, the joined sections are provided with a sheath positioned over the staggered splice.

Figure 4:
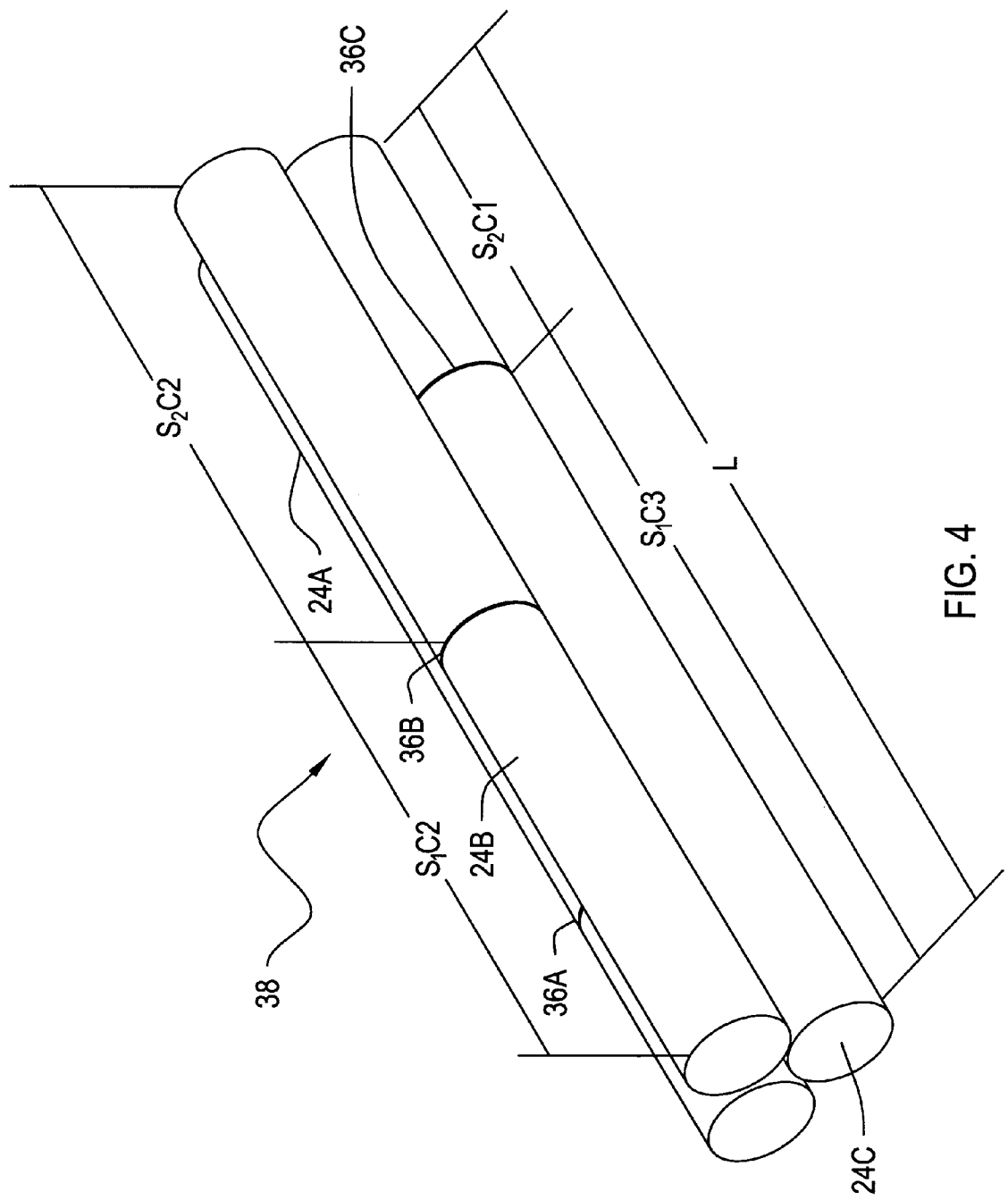
FIG. 4 a perspective substantially diagrammatic view of the core of a spliced multi-fiber optic micro cable illustrating the invented staggered splice.
Figure 5:
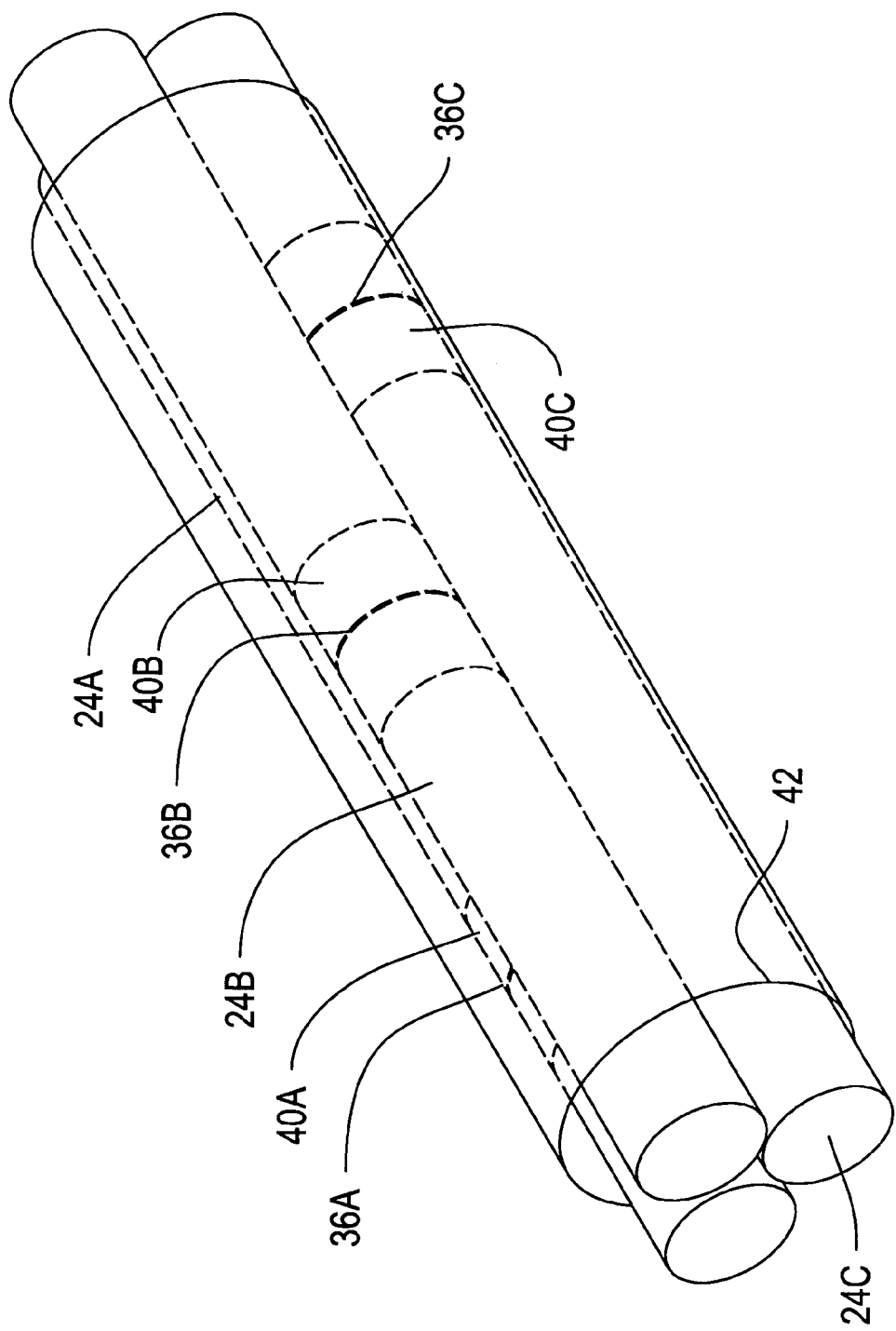
FIG. 5 a perspective substantially diagrammatic view of the spliced multi-fiber optic micro cable shown in FIG. 4 with each of the fibers protected by a protective sleeve, and the overall staggered splice has a protective sheath which bundles the fibers.

Referring to FIG. 5 which diagrammatically illustrates the spliced multi-fiber optic micro cable shown in FIG. 4 with each of the fibers protected by a protective sleeve/mechanical splice apparatus (32A, 32B, 32C), and the overall staggered splice 38 has a protective sheath 42 which bundles the fibers.

Recapping, the splice of a multi-fiber optic cable is comprised of: a first light transmitting interface of facially joined ends of pairs of opposing sections of optic fiber, where the facially joined ends of pairs of opposing sections have a length (L); a second light transmitting interface of facially joined ends of pairs of opposing sections of optic fiber, where the facially joined ends of pairs of opposing sections have substantially the same length (L); and wherein the first light transmitting interface is staggered with respect to the second light transmitting interface. If there is a third optic fiber then there is a third light transmitting interface of facially joined ends of pairs of opposing sections of optic fiber, where the facially joined ends of pairs of opposing sections have substantially the same length (L); and wherein the third light transmitting interface is staggered with respect to the second light transmitting interface, and the third light transmitting interface is staggered with respect to the first light transmitting interface. The splice is further comprised of a protective sleeve or mechanical splice apparatus (40A, 40B, 40C). The joined sections are provided with a sheath 42 positioned over the staggered splice 38.

The method for splicing a multi-fiber optic cable having three optic fibers is as follows. The optic fibers are separated by differentiating a core of an end of a first segment of cable into a first section of optic fiber, a second section, and a third section of optic fiber; differentiating a core of an end of a second segment of cable into a first section of optic fiber, a second section, and a third section of optic fiber. The sections are combined by pairing the first section of optic fiber of the first segment of cable with the first section of optic fiber of the second segment of cable; pairing the second section of optic fiber of the first segment of cable with the second section of optic fiber of the second segment of cable; and pairing the third section of optic fiber of the first segment of cable with the third section of optic fiber of the second segment of cable.

The sections must have the correct length with respect to the other individual pairs of spliced fibers, and this is accomplished by cleaving the pairs of sections so that length of the first section of the first segment of cable and third section of optic fiber of the second segment of cable, have substantially the same length as the second section of the first segment of cable and second section of optic fiber of the second segment of cable, and the same length as the third section of the first segment of cable and the first section optic fiber of the second segment (L). To maintain a staggered splice, in one possible combination of sectional pairs, the length of the first section of the first segment of cable is greater than the length of the second section of the first segment of cable, and the length of the second section is greater than the length of the third section. The second segment of cable has sections of approximately equal length. Obviously, the designation of a section as the first, second or third section is somewhat arbitrary, and other combinations exist.

The splice must enable continuous light transmission, so the interface between connecting optic fibers must provide this by forming a first light transmitting interface of facially joined ends of the first section of the optic fiber of the first segment of cable with the third section of the optic fiber of the second segment of cable; forming a second light transmitting interface of facially joined ends of the second section of the optic fiber of the first segment of cable with the second section of the optic fiber of the second segment of cable; and forming a third light transmitting interface of facially joined ends of the third section of the optic fiber of the first segment of cable with the first section of the optic fiber of the second segment of cable. Finally, the method includes inspecting to insure that the first light transmitting interface is staggered with respect to the second and third light transmitting interface, and that the spliced sections are substantially the same length.

The method can further comprise that after forming the splices, whether mechanical or fusion, protecting the joined pairs of sections of optic fibers. A protective sheath can be formed for instance using shrink wrapped tubing, and/or layering fiberglass yarn so that it surrounds the spliced cable, and applying an adhesive (such as a interpenetrating UV curable adhesive), such that the fiberglass yarn is adhered to the optic fibers and to adjacent fiberglass yarn.

The resulting splicing method is suitable for connecting the first segment of a multi optic fiber micro cable, which is wound into a precision inside payout spools, to the second segment of cable, which is on the shipboard side. After connecting the segments/cables one tests that the torpedo's payout spools wound with the multi optic fiber micro cable has a continuous light transmission between the ship and the torpedo, and that communication is properly functioning.

It is to be understood that the foregoing description and specific embodiments are merely illustrative of the best mode of the invention and the principles thereof, and that various modifications and additions may be made to the invention by those skilled in the art, without departing from the spirit and scope of this invention, which is therefore understood to be limited only by the scope of the appended claims.

What is claimed is:

1. A method for forming a splice of a multi-fiber optic cable, said method comprising:
    differentiating an end of a first segment of cable into a first section of optic fiber, a second section of optic fiber, and a third section of optic fiber;
    differentiating an end of a second segment of cable into a first section of optic fiber, a second section of optic fiber, and a third section of optic fiber;
    pairing the first section of optic fiber of the first segment of cable with the third section of optic fiber of the second segment of cable;
    pairing the second section of optic fiber of the first segment of cable with the second section of optic fiber of the second segment of cable;

pairing the third section of optic fiber of the first segment of cable with the first section of optic fiber of the second segment of cable;

cleaving the pairs of sections so that the first section of the first segment and the third section of the second segment, the second section of the first segment of cable and the second section of the second segment of cable; and the third section of the first segment and first section of optic fiber of the second segment have a length (L) that is substantially the same;

forming a first light transmitting interface of facially joined ends of the first section of the optic fiber of the first segment of cable with the third section of the optic fiber of the second segment of cable;

forming a second light transmitting interface of facially joined ends of the second section of the optic fiber of the first segment of cable with the second section of the optic fiber of the second segment of cable;

forming a third light transmitting interface of facially joined ends of the third section of the optic fiber of the first segment of cable with the first section of the optic fiber of the second segment of cable; and insuring that the first light transmitting interface is staggered with respect to the second light transmitting interface and the third light transmitting interface, that the second light transmitting interface is staggered with respect to the first light transmitting interface and the third light transmitting interface, and that the third light transmitting interface is staggered with respect to the first light transmitting interface and the second light transmitting interface.

2. The method of claim 1, wherein the steps of differentiating the ends of the segments include stripping all external layers and leaving only the bare optic fibers.

3. The method of claim 2, wherein the step of forming the light transmitting interface comprises using a mechanical splice to form an optical junction, wherein a pair of opposing optic fibers are precisely aligned and held in place by a self-contained assembly.

4. The method of claim 2, wherein the step of forming the first, second and third light transmitting interface of facially joined ends further comprises:

precisely aligning the cleaved ends of the first pair of opposing optic fibers in a fusion splicer unit such that the opposing optic fiber ends substantially abut each other, wherein both of the cleaved optic fiber ends have a facial surface that is mirror-smooth and perpendicular to the optic fiber axis;

fusing the first pair of optic fiber ends together with an electric arc;

precisely aligning the cleaved ends of the second pair of opposing optic fibers in the fusion splicer unit such that the opposing optic fiber ends substantially abut each other, wherein both of the cleaved optic fiber ends have a facial surface that is mirror-smooth and perpendicular to the optic fiber axis;

fusing the second pair of optic fiber ends together with an electric arc;

precisely aligning the cleaved ends of the third pair of opposing optic fibers in the fusion splicer unit such that the opposing optic fiber ends substantially abut each other, wherein both of the cleaved optic fiber ends have a facial surface that is mirror-smooth and perpendicular to the optic fiber axis; and fusing the third pair of optic fiber ends together with an electric arc.

5. The method of claim 4, wherein the method further comprises sleeving each of the fused first, second and third pair of fiber optic ends with a protective sleeve which supports the fiber from bending and tensile forces.

6. The method of claim 5, wherein the protective sleeve is at least one of heat shrink tubing, silicone gel and mechanical crimping.

7. The method of claim 6 further comprising applying a sheath around all of the sleeved fused pairs of fiber optic ends.

8. The method of claim 1, wherein the multi-fiber optic cable is a micro cable.

9. The method of claim 8, wherein the first segment of the multi-fiber optic micro cable is provided on a precision inside payout spool and the second segment is provided on the shipboard-side.

10. The method of claim 9, further comprising testing the multi-fiber optic cable to confirm that communication through the multi-optic fiber cable is functioning properly.

* * * * *